United States Patent
Reuillon et al.

(10) Patent No.: US 8,188,910 B2
(45) Date of Patent: May 29, 2012

(54) METHOD FOR THE MULTIDIMENSIONAL TEMPORAL KINEMATIC FILTERING OF RADAR BLIPS, FROM ANTENNA REVOLUTION TO ANTENNA REVOLUTION

(75) Inventors: Philippe Reuillon, Paris (FR); Albert Groenenboom, Waskip (NL); Michel Moruzzis, La Norville (FR)

(73) Assignee: Thales, Neuilly sur Seine (FR)

( * ) Notice: Subject to any disclaimer, the term of this patent is extended or adjusted under 35 U.S.C. 154(b) by 373 days.

(21) Appl. No.: 12/628,562

(22) Filed: Dec. 1, 2009

(65) Prior Publication Data
US 2010/0134346 A1 Jun. 3, 2010

(30) Foreign Application Priority Data
Dec. 2, 2008 (FR) ...................................... 08 06765

(51) Int. Cl.
*G01S 7/292* (2006.01)
*G01S 7/00* (2006.01)
*G01S 13/00* (2006.01)
(52) U.S. Cl. .............. 342/195; 342/89; 342/90; 342/91; 342/93; 342/159; 342/175
(58) Field of Classification Search ............ 342/89–103, 342/175, 195, 159–164, 192–194, 196, 197, 342/13–20, 73–81; 348/571, 699; 382/100, 382/103
See application file for complete search history.

(56) References Cited

U.S. PATENT DOCUMENTS

| | | | | |
|---|---|---|---|---|
| 4,857,934 A * | 8/1989 | Voles | ............................. | 342/90 |
| 5,150,426 A * | 9/1992 | Banh et al. | .................... | 382/103 |
| 5,396,252 A * | 3/1995 | Kelly | ............................... | 342/94 |
| 5,400,087 A * | 3/1995 | Uramoto et al. | .............. | 348/699 |
| 5,499,195 A * | 3/1996 | Castelaz | ........................ | 342/159 |
| 5,644,508 A * | 7/1997 | McNary et al. | ............... | 342/159 |
| 5,798,942 A * | 8/1998 | Danchick et al. | ................ | 342/96 |
| 5,842,156 A * | 11/1998 | Hong et al. | .................. | 342/159 |
| 6,282,301 B1 * | 8/2001 | Haskett | ......................... | 382/103 |
| 6,538,599 B1 * | 3/2003 | David | ........................... | 342/196 |
| 7,026,980 B1 * | 4/2006 | Mavroudakis et al. | ......... | 342/90 |
| 7,394,046 B2 * | 7/2008 | Olsson et al. | ................. | 342/195 |
| 7,663,528 B1 * | 2/2010 | Malakian et al. | ............... | 342/13 |
| 7,868,814 B1 * | 1/2011 | Bergman | ........................ | 342/95 |
| 8,094,060 B2 * | 1/2012 | Beard et al. | ..................... | 342/91 |

FOREIGN PATENT DOCUMENTS

| | | |
|---|---|---|
| EP | 0778470 A1 | 6/1997 |
| GB | 1305181 A | 1/1973 |
| GB | 2054309 A | 2/1981 |
| GB | 2397957 A | 8/2004 |

* cited by examiner

*Primary Examiner* — Bernarr Gregory
(74) *Attorney, Agent, or Firm* — Stroock & Stroock & Lavan LLP

(57) ABSTRACT

The invention relates to the general field of the detection, notably the radar detection, of mobile or fixed targets. It consists of a method making it possible mainly to qualify the blips supplied by the processing subsystem of the detection system before the latter are analyzed to generate tracks, each track being assumed to represent the trajectory of a moving object that has been detected. According to the invention, an analysis duration is considered, and all of the blips detected during this period are considered. These blips are divided up into subsets, each subset corresponding to the blips that, during the analysis duration, have been detected in one and the same analysis channel defined by an initial position and a speed vector. The subsets formed in this way are then grouped together, one and the same group combining the subsets comprising blips for which the combined assertion of a plurality of attributes is verified.

19 Claims, 3 Drawing Sheets

METHOD FOR THE MULTIDIMENSIONAL TEMPORAL KINEMATIC FILTERING OF RADAR BLIPS, FROM ANTENNA REVOLUTION TO ANTENNA REVOLUTION

CROSS REFERENCE TO RELATED APPLICATIONS

The present application claims priority to French Patent Application Serial No. 0806765, filed Dec. 2, 2008, which is hereby incorporated by reference in its entirety.

BACKGROUND OF THE INVENTION

The invention relates to the general field of the detection, notably the radar detection, of mobile or fixed targets. It deals more particularly with the problem of the detection of small targets moving around in a noise-affected environment.

With respect to the radar detection of small targets in an electromagnetic environment disturbed by clutter, sea clutter for example, one of the main problems to be solved to optimize the detection (and consequently the radar-tracking) of the targets consists in finding a means for reducing the false alarm rate by suitably separating the signals corresponding to targets from the signals constituting the ambient clutter, the fluctuation of the signal corresponding to the clutter generating, in a known manner, false alarms. To solve this problem, it is generally necessary to extract from the received signal the greatest possible quantity of information. Now, the simple analysis of the signals received on an antenna revolution often does not make it possible to clearly distinguish whether the received signal corresponds to the signal reflected by a small target or whether this signal corresponds to a particular manifestation of the clutter, the signal produced by a breaking wave for example. It is consequently sometimes necessary to use the information received from one antenna revolution to another in order to be able to make the distinction.

Consequently, the information that is deemed significant that is extracted from the signals received from revolution to revolution must be correlated by taking into account the fact that from one antenna revolution to another the signal reflected by a real target undergoes variations associated with the kinematics of that target. It is therefore necessary to apply a temporal kinematic filtering, in three dimensions, to the received signal, bearing in mind that a target is likely to move in the three dimensions of space. The expression "significant information" should be understood here to mean any information extracted from a signal that has satisfied the detection criteria.

DESCRIPTION OF THE PRIOR ART

One known method for producing this three-dimensional temporal kinematic filtering, from revolution to revolution, is to construct detection subsystems, each detection subsystem comprising all the blips associated to form one and the same track characterizing the movement of one and the same object or target. This filtering is generally produced by the radar-tracking system for which each transmitted item of detection information is considered to represent a potential target. Such an approach, however, necessitates the use of algorithms for creating and maintaining the detection subsystems, whose implementation requires computation times whose durations are generally nonlinear functions of the number of detections processed, functions whose derivatives are themselves increasing functions. Since each track is reflected in the maintenance of the corresponding detection subsystems, it is consequently necessary, for computation workload reasons, to limit the number of detection subsystems handled by the radio-tracking.

SUMMARY OF THE INVENTION

One aim of the invention is to propose a method of multidimensional temporal kinematic filtering, as an alternative to the known method described previously, which is less costly in terms of computation time. Another aim of the invention is thus to allow for the sorting of the potential targets and the radio-tracking of a greater number of real targets.

To this end, the subject of the invention is a method for the multidimensional temporal kinematic filtering of blips, applied to the blips detected during an analysis duration corresponding to a plurality of antenna revolutions. The filtering is in this case performed by means of analysis channels, each analysis channel defining the movement of a target model from an initial position corresponding to the start of the analysis duration. The position of the target model for a given antenna revolution is assigned an uncertainty interval. The method according to the invention is characterized by the following steps:

a first step of storage of the blips detected from antenna revolution to antenna revolution, the storage of the detected blips being done on a given number N of revolutions corresponding to the analysis duration;

a second step of grouping the stored blips into subsets, a subset consisting of the blips located in one and the same analysis channel;

a third step of classifying the various subsets into a plurality of groups, each group corresponding to the subsets comprising blips for which the combined assertion of a plurality of attributes, the value of each attribute being integrated over the analysis duration, is verified;

a fourth step of qualifying the stored blips, the criterion for qualification of a given blip being defined by the membership of the blip to one or another of the groups;

a fifth step of selective transmission of the qualified blips, the conditions for transmission of a blip being dependent on the qualification of this blip.

According to one embodiment of the invention, the third step consists in classifying the various subsets in a number of groups, each group corresponding to the subsets comprising a number n of blips, n being less than a given number P and different from one group to another; the fourth step of qualification of the stored blips consisting in qualifying each blip by an attribute characterizing the membership of the blip to the subsets of the various groups.

According to this embodiment of the invention, the fourth step of qualification of the blips can consist in assigning an attribute to each stored blip, an attribute whose value indicates the group gathering together the subsets, to which the blip belongs, that comprise the greatest number of blips.

According to another embodiment of the invention, the third step consists in classifying the various subsets in two groups, a first group corresponding to the subsets comprising a number n of blips less than a given number P and a second group corresponding to the subsets comprising a number of blips greater than or equal to P. The fourth step of qualification of the stored blips then consists in qualifying each blip by a binary attribute whose value characterizes its membership to a subset of one or another group.

According to this embodiment of the invention, the fourth step of qualification of the blips can consist in assigning a binary attribute to each stored blip, an attribute of which one value indicates that the blip belongs to at least one subset classified in the second group and of which the other value indicates that it does not belong to any subset classified in this second group.

According to this embodiment of the invention, the fifth step of transmission of the blips to the radio-tracking can consist in transmitting only the blips whose binary attributes indicate that these blips belong to at least one subset classified in the second group; the other blips not being transmitted.

According to this embodiment of the invention, the fifth step of transmission of the blips to the radar-tracking can alternatively consist in transmitting all the stored blips, each blip being transmitted with its binary attribute.

According to another embodiment of the invention, each analysis channel used during the second step is defined as an area of multidimensional space (position, speed and time), characterized by an initial position and an initial speed vector, and delimited at each measurement instant by a position uncertainty interval whose dimensions are a function of the accuracy of the measurements carried out, along each of the measurement axes.

According to the preceding embodiment of the invention, the analysis channels can be determined by choosing a set of speed vectors and by considering for each speed vector an initial meshing of the space defined by a plurality of uncertainty intervals, each interval being centred on a given point of this space, so as to cover all of this space.

According to this embodiment, the speed vectors can be chosen with an amplitude and a direction that are constant from one measurement instant to another, each analysis channel defined in this way characterizing the uniform rectilinear movement of a target model from an initial position.

According to this preceding embodiment, the positions on which the various uncertainty intervals are centred can be defined so that each interval is overlapped over half of its area by each of the neighbouring intervals.

According to another embodiment, the speed associated with each blip being considered to be exact, the uncertainty interval delimiting a channel for a given measurement instant has constant dimensions.

According to the invention, the multidimensional space (position, speed, time) can be defined by a time axis and a system of polar coordinates with the radar as its origin, the initial position then being defined by a radial distance, a bearing position and an elevation position and the speed vector by a radial component, a bearing component and an elevation component.

According to the invention, the multidimensional space (position, speed, time) can alternatively be defined by a time axis and a system of polar coordinates with the radar as its origin, the initial position then being defined by a radial distance and a bearing position and the speed vector by a radial component or a bearing component.

Alternatively again, the multidimensional space (position, speed, time) can, according to the invention, be defined by a time axis and a three-dimensional system of Cartesian coordinates with the radar as its origin, the initial position and the components of the speed vector being expressed in this system.

Alternatively again, the multidimensional space (position, speed, time) can be defined by a time axis and a two-dimensional system of Cartesian coordinates with the radar as its origin, the initial position and the components of the speed vector being expressed in this system.

Finally, in another embodiment of the invention, the second step takes into account the instantaneous speed of each blip, a blip being classified in an analysis channel at a given measurement instant $t_i$ only if its instantaneous speed is comparable to that defined for the target model that is embodied by the channel concerned.

Advantageously, the method according to the invention can easily be inserted into a standard processing subsystem downstream of the radar blip forming subsystem and upstream of the radar-tracking subsystem.

It can also act, advantageously, interactively with the radar-tracking function and be configured to act only when the number of blips formed is not compatible with the maximum computation workload allowable by the radar-tracking subsystem, so as to perform a first selection of the blips that the radar-tracking subsystem has to process.

BRIEF DESCRIPTION OF THE DRAWINGS

The characteristics and benefits of the method according to the invention will be better understood from the following description, given in light of the appended figures which represent.

DETAILED DESCRIPTION

Figure 1:
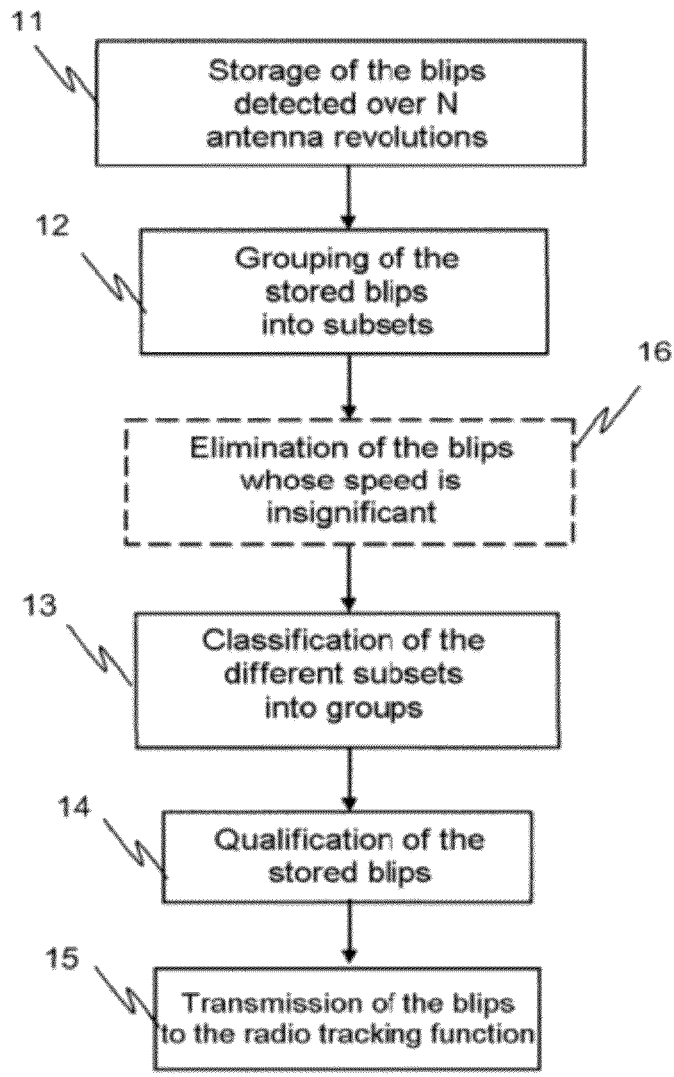
FIG. 1, a theoretical flow diagram of the method according to the invention.

Interest is first focused on FIG. 1, which presents the main steps of the method according to the invention. This method takes place between the processing subsystem responsible for constructing the radar blips and the processing subsystem responsible for the radar-tracking function. The method is advantageously applicable to Doppler and non-Doppler radars. It is also applicable to other detection systems operating on the same principle of the association of detected echoes, for example LIDAR or SONAR systems. To this end, a "blip" is defined here as an object corresponding to the detection at a given instant of a signal obtained from the reflection by a target of the signal transmitted by the detection system concerned, a radar hereinafter in the description. Each blip is notably characterized by the position distance-wise and bearing-wise from the target originating the blip, and possibly by the position elevation-wise and by the instantaneous speed of this target.

The method according to the invention mainly comprises:
- a first step 11 of storage of the blips detected by the detection system, a radar for example;
- a second step 12 of grouping together the stored blips into subsets, a subset containing the blips located within one and the same analysis channel;
- a third step 13 of sorting and dividing up the various subsets formed in the step 12 into a plurality of groups;
- a fourth step 14 of classification of the stored blips, classification that takes into account the dividing up performed in the step 13;
- a fifth step 15 of transmission of the classified blips to the radar-tracking function.

The first step 11 can take different forms. It does, however, consist in performing, from antenna revolution to antenna revolution and for a given number N of antenna revolutions, the storage of the blips detected by the processing subsystem located upstream of the method according to the invention. There is thus obtained, for each antenna revolution, a list of detected blips which, unlike what is generally produced in a radar processing subsystem, are not directly transmitted to the radio-tracking function, but rather stored so as to be analysed together with the stored blips corresponding to the N−1 antenna revolutions that are associated with the antenna revolution concerned.

According to the invention, the depth of storage, that is to say the number of antenna revolutions for which the storage is performed, is determined according to operational parameters which relate, in addition, to the kinematic characteristics assigned to the detected elements. In a simple but nonlimiting variant embodiment, the number of revolutions is notably a function of the time during which a target can be considered to be animated by a uniform rectilinear movement. It is also possible to take into account the reaction time of the radar, that is to say the time of transmission to the radar-tracking of the first blip filtered by the method according to the invention.

It should be noted here that, regarding the method, it is not necessary for the instants of the measurements to be spaced apart by a constant time difference, so that, even if the difference between two measurement instants is variable, the method remains quite applicable.

Figure 2:
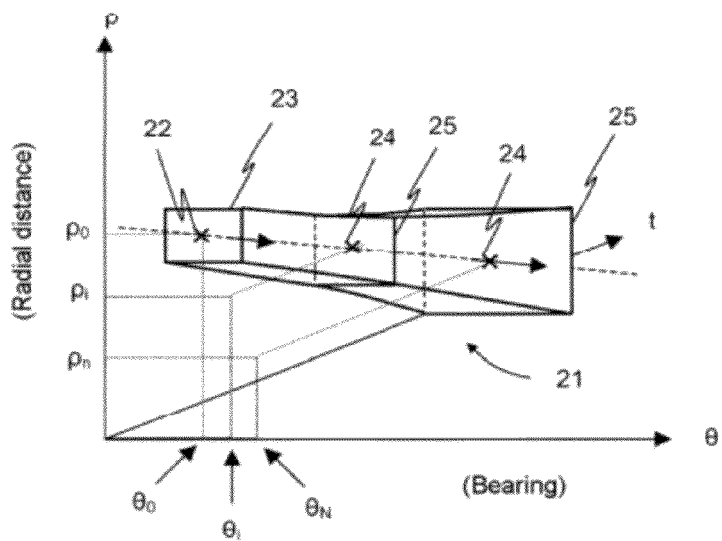
FIG. 2, a diagrammatic representation of a multidimensional analysis channel according to the invention.
Figure 3:
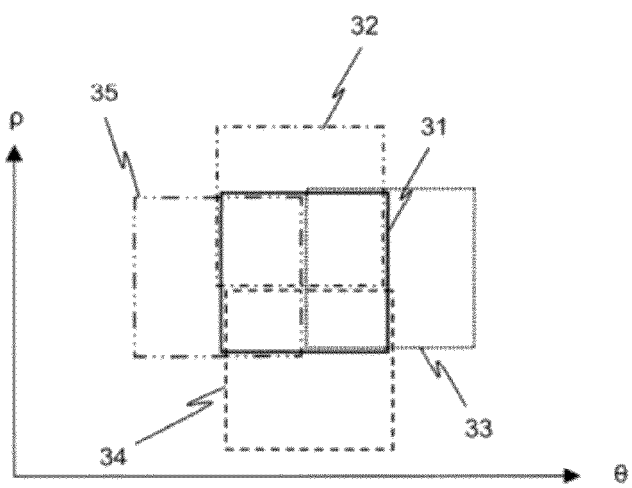
FIG. 3, a two-dimensional diagrammatic representation of the principle of arrangement of the analysis channels.
Figure 4:
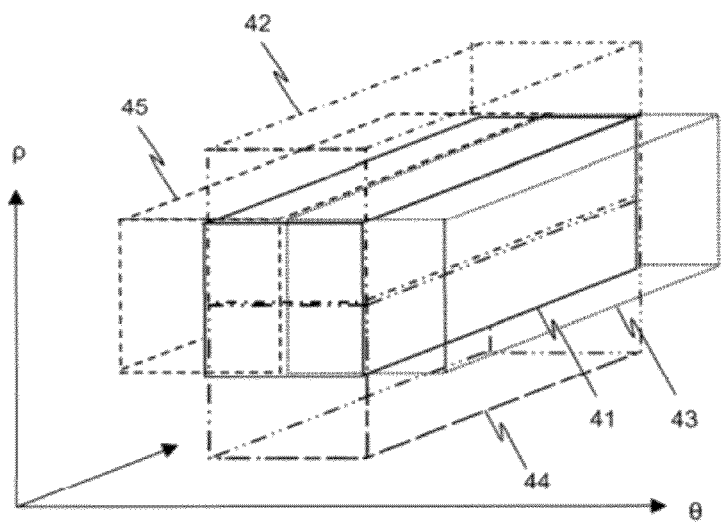
FIG. 4, a multidimensional diagrammatic representation of the principle of arrangement of the analysis channels.

The second step 12 of the method according to the invention is illustrated by FIGS. 2 to 4. It consists in attempting to group together the detected blips according to characteristic subsets. Each subset is attached to a target model whose position moves from revolution to revolution according to a movement model, a uniform rectilinear movement for example, from a given initial position. The initial position and the associated movement model form a multidimensional analysis channel within which are located the blips that can potentially correspond to this target model, given its trend. Consequently, as for a given initial position, there is a plurality of possible movements, the space monitored by the radar is covered by a plurality of analysis channels (21), the blips located in a given channel constituting the corresponding subset.

According to the invention, as illustrated by FIG. 2 in one example, each analysis channel 21 is therefore initially defined (initialized) by the initial position 22 of the target model and by an uncertainty interval 23 surrounding this position. It is then defined from revolution to revolution, over all of the stored revolutions, by the position 24 of the target model at the revolution concerned and by the uncertainty interval 25 surrounding that position. The position of the target model at the revolution concerned is for example determined by the value and the direction of the associated speed vector, which defines the trajectory of the model. For an initial position of the target model, there are thus defined as many analysis channels as there are speed vectors concerned.

In practice, the lengths, in each dimension, of an uncertainty interval 23, 25 are determined for each antenna revolution by taking into account the accuracy of the measurements made by the sensor, in this case the radar. The centre 22, 24 of each interval represents the position at the instant concerned of the target model in multidimensional space formed by the analysis channel 21 concerned.

It should be noted that, in the simplest case, for which the analysis channels are constructed starting from the hypothesis that the measurement of the speed associated with a blip can be considered to be exact, these intervals are independent of the time so that the analysis channel has a section that is constant in time. Outside of this case, these intervals are a function of the time, so that an analysis channel has dimensions that vary in time.

As can be observed from reading the above, the number of analysis channels 21 to be taken into consideration is theoretically infinite, each initial target position giving rise to a plurality of analysis channels. However, given the measurement uncertainties, the number of channels to be taken into consideration is limited by the initial uncertainty interval 23. It is in practice defined so that the joining together of all the initial uncertainty intervals 23 covers all the initial positions 22 that are possible for a target (initial meshing of the space) and that the set of analysis channels covers all the space corresponding to all the movement hypotheses of a target.

Moreover, in a preferred embodiment of the method according to the invention, illustrated by FIG. 3, the number of analysis channels is determined so that the latter can be arranged in such a way that the initial uncertainty intervals of the contiguous analysis channels 31 to 35 exhibit an overlap, the initial uncertainty interval 31 of an analysis channel being, for example, overlapped by those, 32 to 35, of the four adjacent channels. In this way, it can advantageously be checked that each of the stored blips is indeed located in at least one channel. The sampling effects are thus avoided.

Thus, in the simple case described previously, there is obtained for each speed vector concerned an arrangement of analysis channels 41 to 45 exhibiting a regular overlap such as that illustrated by FIG. 4.

It should be noted here that, since the analysis channels have different origins and orientations, orientations that are determined by the length and the direction of the speed vector of the target models represented by each channel, one and the same blip can be, for a given antenna revolution, located in several analysis channels.

Consequently, the blips located in an analysis channel are considered to constitute a subset of blips that can correspond to the moving target model embodied by the analysis channel concerned.

The object of the third step 13 of the method according to the invention is to determine, from the subsets implicitly constituted on completion of the preceding step, which of these subsets group together blips that can, when considered as a whole, correspond to one and the same target. The general operating principle of the method according to the invention consists in determining this correspondence by selecting certain attributes of the blips contained in a subset, for example the amplitude, then in analysing the value of each attribute over all the blips and by analysing the assertion (i.e. the validation relative to a reference value) of a given combination of these various attributes for the subset concerned. Consequently, if the combination is validated, the subset is classified in a first group. Conversely, if the combination is not validated, the subset is classified in a second group. Alternatively, it is possible to envisage several assertions for a given combination. There is then obtained a classification in a plurality of groups, each group containing the subsets for which a given assertion is verified.

Figure 5:
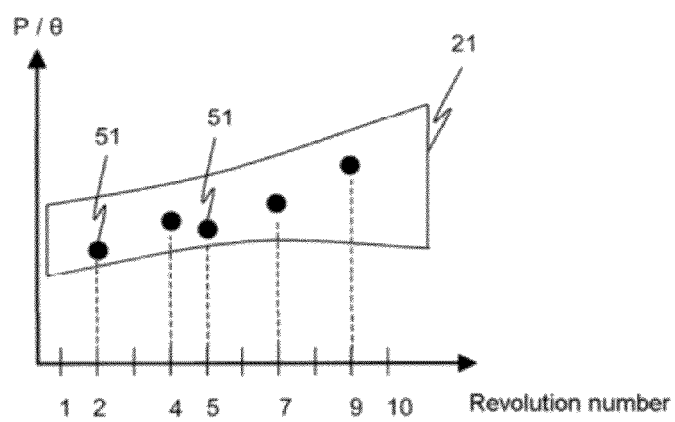
FIG. 5, a diagrammatic illustration of the third step of the method according to the invention, through a particular embodiment.

In the particular embodiment of the method according to the invention that is illustrated by FIG. 5, the step 13 consists initially in counting, for each analysis channel 21, the number of blips 51 that are located within the channel on completion of the N revolutions taken into account. In practice, in each channel, all the blips are counted whose positions for a given revolution are located in the space defined by the channel, without seeking to determine first whether a given blip corresponds or not to a moving target so that its position at each revolution is located in the channel concerned. Consequently, an analysis channel can contain a variable number of blips.

According to this particular embodiment, the step 13 of the method then consists in performing the actual sort process of the subsets of blips constituted in this way. The sort process is in this case performed by analysing the number of blips forming the subset. In practice, given the assumption that the blips located in the analysis channel concerned correspond to a target moving in accordance with the model associated with this channel, a blip can theoretically be expected to be found at each antenna revolution. In this case, the analysis channel then hosts at least N blips that correspond, in all likelihood, to one and the same target. On the other hand, in the contrary case, it has to be considered that the blips located in the channel concerned correspond either to different targets having given rise, for a given antenna revolution, to the formation of a blip located in the analysis channel concerned, or to noise or clutter spikes. Consequently, it can be considered that the blips located in this analysis channel do not constitute a set representative of a real target.

In this particular embodiment, the sort criterion, the attribute concerned, is therefore in this case the presence or absence of blips. As for the assertion concerned, this is the fact that the number n of blips contained in the subset concerned is greater than or equal to a number P taken as a threshold, the subset being considered not to be representative of a target if the number n of blips that it contains is less than P.

There are thus defined, in this particular embodiment, two groups of subsets, a first group of subsets, considered to be representative of targets, and a second group of subsets considered to be not representative.

In theory, the threshold P can be defined as being equal to N. However, because of the selective nature of the formation of the blips from the echoes detected, it should be considered that, for a given antenna revolution, the fluctuation of the signal level reflected by a target leads to a signal level that is too low to give rise to the formation of a blip for the revolution concerned. Consequently, the number of blips counted in the analysis channel corresponding to the movement of this target will be less than the number N for the target considered. Consequently, a sort criterion consisting in considering as representative of a real target only the subsets comprising at least N blips, N being the number of revolutions concerned, would lead to wrongly discarding the subsets which, although comprising a significant number of blips, do not however contain N blips. This is why the threshold P is in this case a threshold deliberately less than N. It can be determined in advance notably according to the probability of detection of an echo and the construction of a blip by the detection subsystem located upstream of the method according to the invention. It can also be determined dynamically from analysis to analysis according to a command sent by the radar-tracking function itself according to the workload that it supports. Thus, in the case of a low workload, the radar-tracking can order the use of a low threshold P then, in the presence of a high workload, order the use of a high threshold. The method according to the invention thus switches from a relaxed filtering function to a severe filtering function.

The object of the fourth step 14 and the fifth step 15 of the method is to produce a conditioning of the stored blips in order to facilitate the processing of these blips by the radar-tracking function.

The step 14 carries out the sorting of the subsets produced by the preceding step and performs a qualification of the stored blips by taking into account all the analysis channels. In this way, if a given blip belongs to at least one subset of blips considered to be representative of a target, this blip is catalogued as being directly analysable by the radar-tracking function. Consequently, an attribute is associated with it, an attribute that characterizes the subset group to which the subset containing this blip belongs. This step therefore leads generally to assigning each blip an attribute characterizing the probability that it has of corresponding to a real target.

Thus, in the particular embodiment described previously, if a given blip belongs to at least one subset of blips containing a number of blips n greater than or equal to P (first group of subsets), subset considered to be representative of a target, it is qualified as being directly analysable by the radar-tracking function. On the other hand, if this blip does not belong to any subset of blips considered to be representative of a target, it is qualified as not being directly analysable by the radar-tracking function.

As for the step 15, this simply consists in transmitting the duly classified blips to the radar-tracking function. According to the embodiment considered, the transmission is performed by various modalities.

Thus, in a first possible embodiment, the step 15 can consist in transmitting to the radar-tracking the set of blips formed, each blip being accompanied by its attribute. The radar-tracking is then responsible for processing the blips in a differentiated manner according to the associated attributes. Alternatively, the step 15 can consist solely in transmitting to the radar-tracking the blips formed whose attribute takes one or more given values and in eliminating the other blips, the latter being considered to be not directly analysable by the radar-tracking, to a degree that can be variable.

In this way, the computation workload of the radar-tracking function is indirectly alleviated, by, for example, enabling the radar-tracking, in the event of an overload, to give priority to considering the blips whose attribute indicates that they are directly analysable.

In the particular embodiment described previously, illustrated by FIG. 5, the step 15 of the method according to the invention can consist in simply transmitting the blips contained in a subset of the first group, and in eliminating the other blips. Alternatively, the step 15 of the method can consist in transmitting each blip with a binary attribute indicating whether the blip concerned is likely or not likely to represent a target.

The steps 11 to 15 constitute, as has been stated previously, the main characteristic steps of the method according to the invention.

In this basic version, the method according to the invention offers the advantage of working on the basis of blips that are solely characterized by their positions. Thus, there is no need to know with accuracy the instantaneous speed of an echo in order to implement this method. For a radar application, the instantaneous speed can be obtained by analysing the Doppler effect. Nevertheless, in a more sophisticated version, the method according to the invention can optionally include an intermediate step 16 that can be located between the second step 12 of grouping together the blips into subsets and the third step 13 of grouping together the subsets into two categories.

This separator step 16, which can also be integrated in the second step 12 of the method according to the invention, consists in taking into account for each blip certain components or all the components of the instantaneous speed that is associated with it and in testing the compatibility of the duly determined instantaneous speed with the speed of the target model corresponding to the analysis channel in which it is located. Consequently, if the two speeds are compatible, given any biases that can affect the determination of the speed according to the principle applied for determining the latter (speed ambiguity for example), the blip is maintained in the subset of blips corresponding to the analysis channel concerned. Otherwise, the blip is eliminated from the subset.

This complementary step advantageously makes it possible to make the method according to the invention more effective and more rapid overall. In practice, in subsequent steps 13, 14 and 15 only the blips validated by the step 16 are used. Furthermore, the subsets to which the step 13 is applied are subsets whose blips have an instantaneous speed that conforms to that of the model to which the subset relates, so that counting these blips to determine whether the subset is part of one or another of the two categories defined in the step 13 is more relevant.

According to a particular variant of the particular embodiment illustrated by FIG. 5, the step 13 of the method according to the invention can consist in counting all the blips contained in each subset and in comparing the number n of blips contained in each subset no longer with a single value P, but with a set of values, three values P, Q and R for example. There are thus defined, depending on whether n is greater than or equal to P, Q or R, a plurality of groups of subsets, four groups for example. Consequently, the step 14 of the method then consists in qualifying each blip by an attribute reflecting the membership of the subset to which it belongs to one or another of the groups. The value of the attribute corresponds to the greatest of the thresholds P, Q or R that n equals or exceeds. In other words, the value of the attribute qualifying the blip indicates the group containing the subsets, to which the blip belongs, that include the highest number of blips.

The rest of the description presents an exemplary application of the method according to the invention.

The exemplary application presented here considers a simple coastal radar case in which it is assumed that the targets (the boats) have a movement that can be considered to be uniform rectilinear over ten antenna revolutions (Q=10 observations) and a two-dimensional Doppler radar (2D radar) whose resolution in radial distance is $\sigma_r$=6 m and whose resolution in azimuth is $\sigma_{az}$=0.1°. The speed of rotation of the radar antenna is in this case set at one revolution in two seconds.

It is also assumed that the processing performed upstream of the method according to the invention includes a Doppler filtering with N Doppler filters and that the ambiguous speed is $V_a$ m/s.

Assuming that there are a number of possible considerations for determining the size and the form of the analysis channels, notably the computation time, the available memory or the measurement accuracy, the measurement accuracy will in this case simply be taken into account.

Consequently, the choice is made to construct, for each speed vector concerned, a set of analysis channels uniformly distributed over the space (radial distance, azimuth, time), this set forming a meshing of the space concerned. Each analysis channel is defined by constant uncertainty intervals that depend on the resolution of the radar. Thus, a choice is made that $\Delta_r = 4 \cdot k_r \cdot \sqrt{2} \cdot \sigma_r$ and $\Delta_{az} = 4 \cdot k_{az} \cdot \sqrt{2} \cdot \sigma_{az}$, $k_r$ and $k_{az}$ being uncertainty parameters. Each analysis channel also half overlaps the neighbouring analysis channel in the distance and azimuth direction as in the illustration of FIG. 3. Values of 1.5 for $k_r$ and $k_{az}$ make it possible to ensure a very low probability of not finding a true target in one of the analysis channels. $\Delta_r$=51 m and $\Delta_{az}$=0.85° are therefore found.

In such a context, the meshing considered for a given antenna revolution is a simple translation of the meshing of the preceding revolution. The translation is equal to $T \cdot V_r$ in distance and to $T \cdot V_{az}$ in azimuth, T representing the duration of an antenna revolution, and $V_r$ and $V_{az}$ respectively representing the radial speed and the speed along the axis of the azimuth.

In the example described here, speed vectors are considered whose radial components are spaced apart by a pitch $\Delta V_r$ equal to 1.4 m/s ($\Delta V_r = \Delta_r / 2 \cdot 1 / (T \cdot (Q-1))$) and whose components along the azimuth axis are spaced apart by a pitch $\Delta V_{az}$ equal to 0.024°/s ($\Delta V_{az} = \Delta_{az} / 2 \cdot 1 / (T \cdot (Q-1))$). This configuration provides for a total overlap so as not to reject the targets.

For each detection made by the radar, it is also considered that, if the following equation is satisfied:

$$\left| \frac{V_{Dopp} - V_r}{V_a} - \text{round}\left( \frac{V_{Dopp} - V_r}{V_a} \right) \right| < \sqrt{\frac{1}{N^2} + \left(\frac{\Delta V_r}{V_a}\right)^2},$$

in which "round" represents the commonly defined rounding function, then the blips characterized by this Doppler speed are taken into account for each channel defined by a radial speed equal to $V_r$. This Doppler validity test is justified by the fact that $V_a/N$ represents the Doppler measurement accuracy.

A binary decision criterion can be selected that counts the number of detections in each analysis channel, and if this number exceeds 8 out of 10 revolutions, the detections of the analysis channel are retained. In this case, a significant reduction in the number of blips is obtained that enables the radiotracking to be less loaded with false alarms. The probability of having 8 false blips aligned during 10 antenna revolutions is negligible.

The invention claimed is:

1. A method for the multidimensional temporal kinematic filtering of blips applied to the blips detected during an analysis duration corresponding to a plurality of antenna revolutions, the filtering being performed by means of analysis channels each analysis channel defining the movement of a target model from an initial position corresponding to the start of the analysis duration, the position of the target model for a given antenna revolution being assigned an uncertainty interval said method comprising:
   a first step of storage of the blips detected from antenna revolution to antenna revolution, the storage of the detected blips being done for a given number N of revolutions corresponding to the analysis duration;
   a second step of grouping the stored blips into subsets, a subset comprising the blips located in one and the same analysis channel;
   a third step of classifying the various subsets into a plurality of groups, each group corresponding to the subsets comprising blips for which the combined assertion of a plurality of attributes, the value of each attribute being integrated over the analysis duration, is verified;
   a fourth step of qualifying the stored blips, a criterion for qualification of a given blip being defined by the membership of the blip to one or another of the groups;
   a fifth step of selective transmission of the qualified blips, the conditions for transmission of a blip being dependent on the qualification of this blip.

2. The method according to claim 1, wherein the third step comprises classifying the various subsets in several groups, each group corresponding to the subsets comprising a number n of blips less than a given number P, different from one group to another; the fourth step of qualification of the stored blips comprises qualifying each blip by an attribute characterizing the membership of the blip to the subsets of the various groups.

3. The method according to claim 2, wherein the fourth step of qualification of the blips comprises assigning an attribute to each stored blip an attribute whose value indicates the group gathering together the subsets, to which the blip belongs, that comprise the greatest number of blips.

4. The method according to claim 1, wherein the third step comprises classifying the various subsets in two groups, a first group corresponding to the subsets comprising a number n of blips less than a given number P and a second group corresponding to the subsets comprising a number of blips greater than or equal to P; the fourth step of qualification of the stored blips comprises qualifying each blip by a binary attribute whose value characterizes its membership to a subset of one or another group.

5. The method according to claim 4, wherein the fourth step of qualification of the blips comprises assigning a binary attribute to each stored blip, an attribute of which one value indicates that the blip belongs to at least one subset classified in the second group and of which the other value indicates that it does not belong to any subset classified in this second group.

6. The method according to claim 5, wherein the fifth step of transmission of the blips to the radio-tracking transmits only the blips whose binary attributes indicate that these blips belong to at least one subset classified in the second group; the other blips not being transmitted.

7. The method according to claim 5, wherein the fifth step of transmission of the blips to the radar-tracking transmits all the stored blips, each blip being transmitted with its binary attribute.

8. The method according to claim 4, wherein during the second step the instantaneous speed of each blip is taken into account, a blip being classified in an analysis channel at a given measurement instant $t_i$, only if its instantaneous speed is comparable to that defined for the target model that is embodied by the channel concerned.

9. The method according to claim 1, wherein each analysis channel used during the second step is defined as an area of multidimensional space (position, speed and time), —defined by an initial position and an initial speed vector, and delimited at each measurement instant by a position uncertainty interval whose dimensions are a function of the accuracy, along each of the measurement axes, of the measurements carried out.

10. The method according to claim 9, wherein the analysis channels are determined by choosing a set of speed vectors and by considering for each speed vector an initial meshing of the space defined by a plurality of uncertainty intervals; each interval being centred on a given point of this space, so as to cover all of this space.

11. The method according to claim 10, wherein the positions on which the various uncertainty intervals are centred are defined so that each interval is overlapped over half of its area by each of the neighbouring intervals.

12. The method according to claim 10, wherein the chosen speed vectors have an amplitude and a direction that are constant from one measurement instant to another, each analysis channel defined in this way characterizing the uniform rectilinear movement of a target model from an initial position.

13. The method according to claim 10, wherein, the speed associated with each blip being considered to be exact, the uncertainty interval that delimits a channel for a given measurement instant has constant dimensions.

14. The method according to claim 9, wherein the multidimensional space (position, speed, time) is defined by a time axis and a system of polar coordinates with the radar as its origin, the initial position being defined by a radial distance, a bearing position and an elevation position and the speed vector by a radial component, a bearing component and an elevation component.

15. The method according to claim 9, wherein the multidimensional space (position, speed, time) is defined by a time axis and a system of polar coordinates with the radar as its origin, the initial position being defined by a radial distance and a bearing position and the speed vector by a radial component and a bearing component.

16. The method according to claim 9, wherein the multidimensional space (position, speed, time) is defined by a time axis and a three-dimensional system of Cartesian coordinates with the radar as its origin, the initial position and the components of the speed vector being expressed in this system.

17. The method according to claim 9, wherein the multidimensional space (position, speed, time) being defined by a time axis and a two-dimensional system of Cartesian coordinates with the radar as its origin, the initial position and the components of the speed vector are expressed in this system.

18. The method according to claim 9, wherein during the second step the instantaneous speed of each blip is taken into account, a blip being classified in an analysis channel at a given measurement instant $t_i$, only if its instantaneous speed is comparable to that defined for the target model that is embodied by the channel concerned.

19. The method according to claim 1, wherein during the second step the instantaneous speed of each blip is taken into account, a blip being classified in an analysis channel at a given measurement instant $t_i$, only if its instantaneous speed is comparable to that defined for the target model that is embodied by the channel concerned.

* * * * *